UNITED STATES PATENT OFFICE.

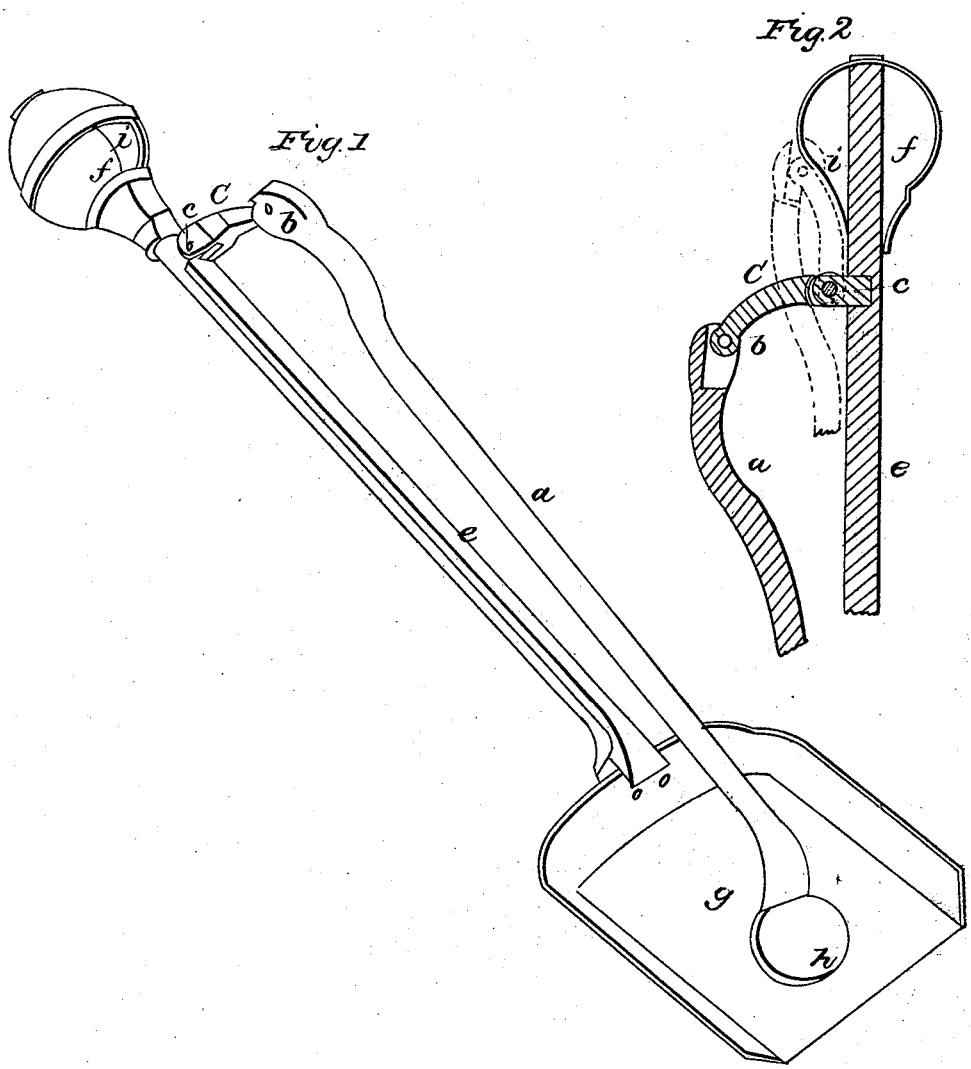

HARRISON OGBORN, OF RICHMOND, INDIANA.

SHOVEL AND TONGS COMBINED.

Specification forming part of Letters Patent No. 52,590, dated February 13, 1866.

*To all whom it may concern:*

Be it known that I, HARRISON OGBORN, of Richmond, in the county of Wayne and State of Indiana, have invented certain new and useful Improvements in Combined Shovel and Tongs, of which the following is a full, clear, and exact description, reference being had to the accompanying drawings, made a part of this specification, and to the letters of reference thereon, the same letters in the different figures referring to identical parts.

Figure 1 is a perspective view. Fig. 2 shows the mode of attaching the shovel and leg of the tongs, the dotted line showing the position when used as a shovel.

The shovel is of ordinary construction. One leg of an ordinary pair of tongs, *a*, is employed, attached at *b* by a pivot to a short hinge, C, attached by the pivot *c* to the handle of the shovel by a projection fitting into the bifurcated end of the hinge-joint C. The head *f* of the handle *e* of the shovel is cut away, as shown at *i*, to admit the hinge-joint of the tongs when the same is retracted, permitting the use of the shovel alone, as shown in Fig. 2.

In operating with the combined shovel and tongs, if intended to be used as a pair of tongs, the leg of the tongs is advanced, as shown in Fig. 1, the shovel forming the other leg of the tongs. When the shovel alone is used the leg *a* is retracted, as shown by the dotted lines in Fig. 2, and the leg *e* folded upon forms part of the handle of the shovel.

Having fully explained the nature and mode of operating my invention, what I claim as my invention, and seek to secure by Letters Patent, is—

Constructing a combined shovel and tongs having the leg *a* attached to the handle of the shovel by means of the hinge-joint C, pivoted substantially as set forth.

In testimony whereof I have signed my name to this specification in the presence of two subscribing witnesses.

HARRISON OGBORN.

Witnesses:
- R. MASON,
- D. P. HOLLOWAY.